United States Patent
Hayashi

(10) Patent No.: US 11,687,964 B2
(45) Date of Patent: Jun. 27, 2023

(54) INFORMATION PROCESSING DEVICE, INFORMATION PROCESSING METHOD, AND PROGRAM RECORDING MEDIUM

(71) Applicant: NEC CORPORATION, Tokyo (JP)

(72) Inventor: Katsutoshi Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 604 days.

(21) Appl. No.: 16/338,863

(22) PCT Filed: Oct. 2, 2017

(86) PCT No.: PCT/JP2017/035817
§ 371 (c)(1),
(2) Date: Apr. 2, 2019

(87) PCT Pub. No.: WO2018/066511
PCT Pub. Date: Apr. 12, 2018

(65) Prior Publication Data
US 2021/0279758 A1    Sep. 9, 2021

(30) Foreign Application Priority Data

Oct. 3, 2016 (JP) ................................ 2016-195792

(51) Int. Cl.
*G06Q 20/40* (2012.01)
*G06Q 20/34* (2012.01)
(Continued)

(52) U.S. Cl.
CPC ....... *G06Q 30/0226* (2013.01); *G06Q 20/346* (2013.01); *G06Q 20/40145* (2013.01); *G06Q 30/0185* (2013.01)

(58) Field of Classification Search
CPC ........ G06Q 20/10; G06Q 20/12; G06Q 30/06; G06Q 20/04; G06Q 20/02; G06Q 20/20;
(Continued)

(56) References Cited

U.S. PATENT DOCUMENTS

2005/0096981 A1    5/2005 Shimada
2006/0047971 A1*   3/2006 Miyazaki ........... G06V 40/1306
                                                     713/186
(Continued)

FOREIGN PATENT DOCUMENTS

JP    2002-056066 A    2/2002
JP    2005-141316 A    6/2005
(Continued)

OTHER PUBLICATIONS

Meng et al., "Surveying the Development of Biometric User Authentication on Mobile Phones" (Year: 2015).*
(Continued)

*Primary Examiner* — Thien T Mai
(74) *Attorney, Agent, or Firm* — Sughrue Mion, PLLC

(57) ABSTRACT

Provided are an information processing device, etc. by which points can be given in various manners without performing complicated operations. The information processing device is provided with: acquisition means for acquiring user's biometric information; authentication means for authenticating a user by using the biometric information acquired by the acquisition means, and referring to storage means for storing user information pertaining to a plurality of users and point information in association with identification information of a single point card, the user information including user identification information and user's biometric information; calculation means for calculating a point value according to a combination of the authenticated users when the authentication is successful; and processing means for adding the point value calculated by the calculation means to the point value stored, in association with the user identification information of the successfully authenticated user, in the storage means.

19 Claims, 12 Drawing Sheets

(51) Int. Cl.
*G06Q 20/20* (2012.01)
*G06Q 30/0226* (2023.01)
*G06Q 30/018* (2023.01)

(58) Field of Classification Search
CPC ...... G06Q 20/341; G06Q 30/02; G06Q 20/28; G06Q 20/24; G06Q 20/40; G06Q 20/387; G06Q 20/105; G06Q 20/342; G06Q 40/00; G06Q 40/02; G06Q 20/3278; G06Q 20/102; G06Q 20/1235; G06Q 20/384; G06Q 30/0226; G06Q 20/202; G06Q 30/0601; G06Q 20/363; G06Q 20/023; G06Q 20/32; G06Q 20/354; G06Q 20/352; G06Q 40/12; G06Q 20/227; G06Q 30/0215; G06Q 20/3674; G06Q 20/36; G06Q 30/0234; G06Q 20/204; G06Q 20/3552; G06Q 20/34; G06Q 20/382; G06Q 20/347; G06Q 20/3572; G06Q 20/123; G06Q 20/327; G06Q 20/367; G06Q 20/355; G06Q 40/025; G06Q 20/3415; G06Q 20/3563; G06Q 20/3823; G06Q 20/42; G06Q 2220/00; G06Q 30/0231; G06Q 30/0252; G06Q 30/0256; G06Q 30/0282; G06Q 10/06398; G06Q 10/105; G06Q 20/348; G06Q 20/3555; G06Q 30/0258; G06Q 30/0267; G06Q 30/08; G06Q 20/065; G06Q 20/145; G06Q 20/203; G06Q 20/223; G06Q 20/3229; G06Q 20/3567; G06Q 20/35765; G06Q 30/016; G06Q 30/0202; G06Q 30/0205; G06Q 30/0211; G06Q 30/0217; G06Q 30/0253; G06Q 30/0268; G06Q 30/0275; G06Q 30/0279; G06Q 30/0603; G06Q 30/0605; G06Q 30/0623; G06Q 30/0639; G06Q 50/12; G06Q 10/063; G06Q 10/0631; G06Q 10/06315; G06Q 10/0635; G06Q 20/0457; G06Q 20/29; G06Q 20/3265; G06Q 20/3272; G06Q 20/3558; G06Q 20/3678; G06Q 20/4015; G06Q 30/0185; G06Q 30/0206; G06Q 30/0208; G06Q 30/0214; G06Q 30/0242; G06Q 30/0251; G06Q 30/0264; G06Q 30/0277; G06Q 30/0613; G06Q 20/40145; G06Q 20/346; G06Q 20/4014; G06Q 20/3821; G06Q 20/3276; G06K 19/07707; G06K 19/06187; G06K 19/0718; G06K 19/07749; G06K 19/0723

See application file for complete search history.

(56) References Cited

U.S. PATENT DOCUMENTS

| | | | | |
|---|---|---|---|---|
| 2007/0167226 A1* | 7/2007 | Kelly | ...................... | G07F 17/32 |
| | | | | 463/29 |
| 2012/0115591 A1* | 5/2012 | Palermo | .................. | G07F 17/34 |
| | | | | 463/25 |
| 2013/0080238 A1* | 3/2013 | Kelly | .................. | G07F 17/3255 |
| | | | | 705/14.27 |
| 2015/0072752 A1* | 3/2015 | Melnick | .............. | G07F 17/3239 |
| | | | | 463/20 |
| 2015/0278840 A1 | 10/2015 | Zhao et al. | | |
| 2015/0310380 A1* | 10/2015 | Acres | .................. | G07F 17/3239 |
| | | | | 705/7.16 |
| 2017/0186270 A1* | 6/2017 | Acres | .................. | G07F 17/3272 |

FOREIGN PATENT DOCUMENTS

| | | | | |
|---|---|---|---|---|
| JP | 2005141316 A | * | 6/2005 | ......... G06Q 30/0238 |
| JP | 2008-009653 A | | 1/2008 | |
| JP | 2010-061467 A | | 3/2010 | |
| JP | 2011-141839 A | | 7/2011 | |
| JP | 2014-099011 A | | 5/2014 | |
| JP | 2015-170087 A | | 9/2015 | |
| JP | 2016-077639 A | | 5/2016 | |

OTHER PUBLICATIONS

Soltane et al., "Face_and_speech_based_multi_modal_biomet" (Year: 2010).*
International Search Report for PCT/JP2017/035817 dated, Nov. 28, 2017 (PCT/ISA/210).
Written Opinion of the International Searching Authority for PCT/JP2017/035817 dated, Nov. 28, 2017(PCT/ISA/237).

* cited by examiner

| CARD IDENTIFICATION INFORMATION | USER IDENTIFICATION INFORMATION | BIOMETRIC INFORMATION | POINT INFORMATION |
|---|---|---|---|
| XXXXX | 12345 |  | 123pt |
| | 54321 |  | |
| YYYYY | 13579 |  | 567pt |
| | 02468 |  | |
| | 67890 | | |
| | 09876 | | |

Fig.6

| CARD IDENTIFICATION INFORMATION / 11 | COMBINATION INFORMATION / 16 | CALCULATION CRITERION INFORMATION (SCALE FACTOR) / 17 |
|---|---|---|
| XXXXX | ONLY 12345<br>ONLY 54321 | x1 |
| | 12345 AND 54321 | x2 |
| YYYYY | ONLY 13579<br>ONLY 02468<br>ONLY 67890<br>ONLY 09876 | x1 |
| | 13579 AND 02468 | x1.2 |
| | 13579 AND 67890 | x1.5 |
| | 13579 AND 09876 | x2 |
| | 02468 AND 67890 | x1.5 |
| | 02468 AND 09876 | x2 |
| | 67890 AND 09876 | x1.2 |
| | 13579, 02468, AND 67890 | x3 |
| | ⋮ | ⋮ |
| | 13579, 02468, 67890, AND 09876 | x4 |

| CARD IDENTIFICATION INFORMATION (11) | USER IDENTIFICATION INFORMATION (12) | BIOMETRIC INFORMATION (13) | ATTRIBUTE INFORMATION (18) | POINT INFORMATION (15) |
|---|---|---|---|---|
| XXXXX | 12345 |  | 84 YEARS OLD | 123pt |
|  | 54321 |  | 84 YEARS OLD |  |
| YYYYY | 13579 |  | 50 YEARS OLD | 567pt |
|  | 02468 |  | 45 YEARS OLD |  |
|  | 67890 |  | 9 YEARS OLD |  |
|  | 09876 |  | 0 YEARS OLD |  |

{ 14a: columns 12, 13, 18 }

Fig.8

| CONDITION IDENTIFICATION INFORMATION | CONDITION INFORMATION | CALCULATION CRITERION INFORMATION (SCALE FACTOR) |
|---|---|---|
| 1 | INCLUDING BABY LESS THAN TWELVE MONTHS OLD | x3 |
| 2 | INCLUDING PERSON AGED 6 OR ABOVE AND 18 OR UNDER | x1.2 |
| 3 | INCLUDING PERSON AGED 60 OR ABOVE | x1.4 |

Fig.9

| THRESHOLD VALUE INFORMATION (21) | CALCULATION CRITERION INFORMATION (SCALE FACTOR) (17b) |
|---|---|
| ALL PERSONS ARE 90% OR MORE | x1.2 |
| MAJORITY IS 90% OR MORE | x1.1 |

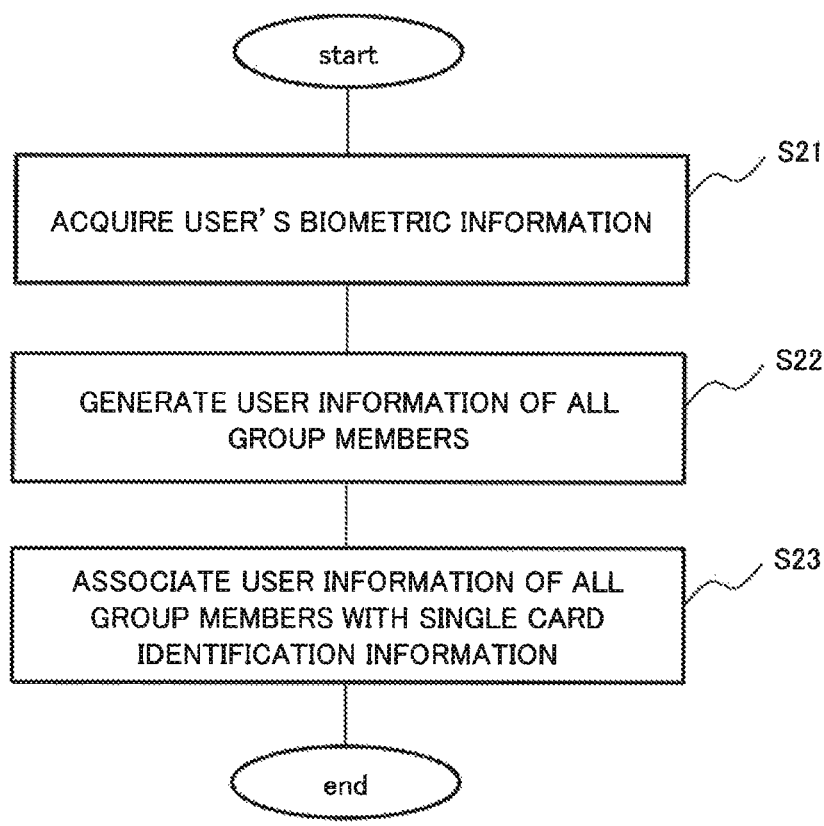

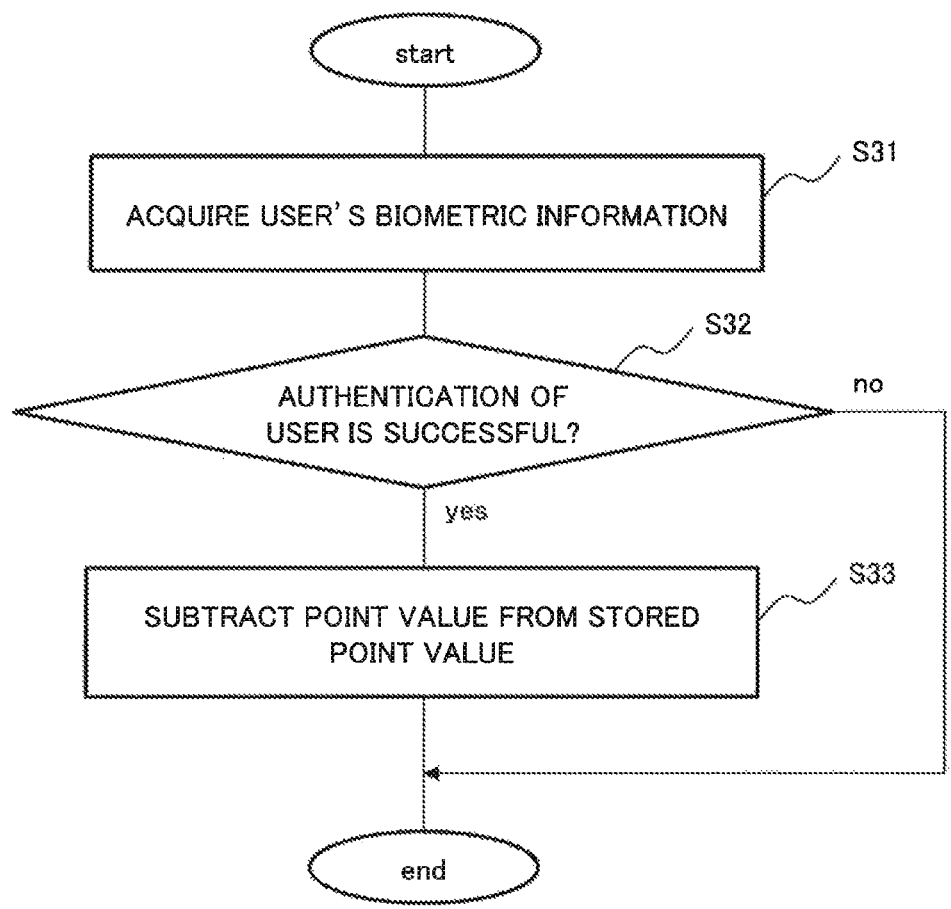

INFORMATION PROCESSING DEVICE, INFORMATION PROCESSING METHOD, AND PROGRAM RECORDING MEDIUM

CROSS REFERENCE TO RELATED APPLICATIONS

This application is a National Stage of International Application No. PCTJP2017/035817 filed Oct. 2, 2017, claiming priority based on Japanese Patent Application No. 2016-195792, filed Oct. 3, 2016, the disclosure of which is hereby incorporated by reference thereto in its entirety.

TECHNICAL FIELD

The present invention relates to an information processing device, an information processing method, and a program recording medium.

BACKGROUND ART

There is widely utilized a point card with which a point is given according to a purchase price when a commodity is purchased at a store, and a service such as a discount or cashback is offered according to a cumulative value of points. A point card is issued for each individual person, and a point according to a purchase price of the individual person is given.

PTL 1 discloses a prize exchange reception device which performs face authentication when a prize exchange using a game medium owned by a player is requested at a game shop, and permits a prize exchange using a game medium owned by a player when a requester who requests a prize exchange is a player or a family member of the player.

CITATION LIST

Patent Literature

[PTL 1] Japanese Unexamined Patent Application Publication No. 2016-077639

SUMMARY OF INVENTION

Technical Problem

When a point card service is introduced in order to encourage a customer to visit a store or purchase a commodity, various giving manners of a point in such a way as to fulfill a satisfaction degree of a customer are desired. However, when various giving manners are introduced, there is an issue that an operation pertaining to point giving becomes complicated, and a burden increases on a store.

The prize exchange reception device described in PTL 1 is a device serving to improve convenience of a prize exchange using a game medium, and is not a device pertaining to point giving.

The present invention has been made in view of the problem described above. One object of the present invention is to provide an information processing device, an information processing method, and a program recording medium by which a point can be given in various manners without performing a complicated operation.

Solution to Problem

An information processing device according to the present invention includes:

acquisition means for acquiring user's biometric information;

authentication means for authenticating a user by using the biometric information acquired by the acquisition means, and referring to storage means for storing user information pertaining to a plurality of users and point information in association with identification information of a single point card, the user information including user identification information and user's biometric information;

calculation means for calculating a point value according to a combination of the authenticated users when the authentication is successful; and processing means for adding the point value calculated by the calculation means to the point value stored, in association with the user identification information of the successfully authenticated user, in the storage means.

An information processing method according to the present invention includes:

an acquisition step for acquiring user's biometric information;

an authentication step for authenticating a user by using the biometric information acquired in the acquisition step, and referring to storage means for storing user information pertaining to a plurality of users and point information in association with identification information of a single point card, the user information including user identification information and user's biometric information;

a calculation step for calculating a point value according to a combination of the authenticated users when the authentication is successful; and an addition step for adding the point value calculated in the calculation step to the point value stored, in association with the user identification information of the successfully authenticated user, in the storage means.

A program storage medium according to the present invention stores a program that causes a computer to execute:

an acquisition process of acquiring user's biometric information;

an authentication process of authenticating a user by using the biometric information acquired in the acquisition step, and referring to storage means for storing user information pertaining to a plurality of users and point information in association with identification information of a single point card, the user information including user identification information and user's biometric information;

a calculation process of calculating a point value according to a combination of the authenticated users when the authentication is successful; and an addition process of adding the point value calculated in the calculation process to the point value stored, in association with the user identification information of the successfully authenticated user, in the storage means.

Advantageous Effects of Invention

According to the present invention, there are provided an information processing device, an information processing method, and a program recording medium by which a point can be given in various manners without performing a complicated operation.

BRIEF DESCRIPTION OF DRAWINGS

FIG. 6 is a diagram illustrating one example of information stored by a storage unit.

FIG. 8 is a diagram illustrating one example of information stored by the storage unit.

FIG. 9 is a diagram illustrating one example of information stored by the storage unit.

FIG. 11 is a flowchart describing an operation of the information processing device 3000.

FIG. 12 is a flowchart describing an operation of the information processing device 3000.

EXAMPLE EMBODIMENT

Hereinafter, example embodiments of the present invention will be described with reference to the drawings. Note that a similar reference sign is given to a similar component in all of the drawings, and a description is suitably omitted. Moreover, in each block diagram, unless otherwise specifically described, each block represents not a configuration of a hardware unit, but a configuration of a functional unit.

First Example Embodiment

Configuration

Figure 1:
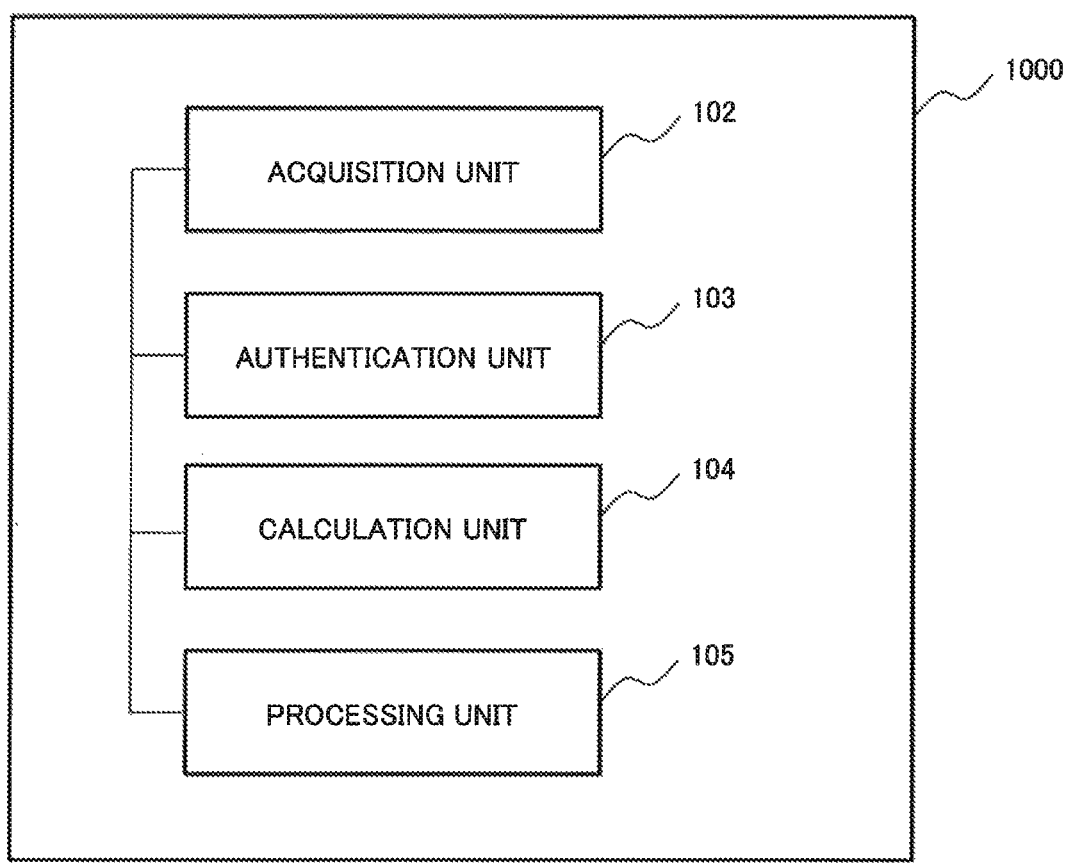
FIG. 1 is a diagram illustrating a configuration of an information processing device 1000 according to a first example embodiment.

FIG. 1 is a diagram illustrating a configuration of an information processing device 1000 according to a first example embodiment. The information processing device 1000 includes an acquisition unit 102, an authentication unit 103, a calculation unit 104, and a processing unit 105.

The acquisition unit 102 acquires user's biometric information. The acquisition unit 102 is, for example, a camera, a microphone, a load cell, a pressure sensor, or each of various authentication sensors.

The authentication unit 103 authenticates a user by using biometric information acquired by the acquisition unit 102, and referring to a storage unit (not illustrated). For authentication using biometric information, an existing authentication technique can be used. Note that the authentication unit 103 can also authenticate a user by using a feature value of the user generated on the basis of biometric information acquired by the acquisition unit 102.

Figure 2:
FIG. 2 is a diagram illustrating one example of information stored by a storage unit.
Figure 2:
Figure 2:
Figure 2:

FIG. 2 is a diagram illustrating one example of information stored by the storage unit. The storage unit stores user information 14 pertaining to a plurality of users and point information 15 in association with identification information (card identification information) 11 of a single point card. The user information 14 includes user identification information 12 and user's biometric information 13.

Here, a point card refers to, for example, a card issued in a point card service in which a point is given according to a visit to a store or according to a purchase of a commodity at a store, and a service such as a discount or cashback is offered according to a cumulative value of given points. The card identification information 11 is information for identifying a point card.

The user identification information 12 is information allocated to each user in order to identify a user of a point card.

The user's biometric information (biometric information) 13 is biometric information of a user of a point card, and is information pertaining to a physical feature of a user, such as face image information, voiceprint information, footprint information, fingerprint information, vein information, or retina information of a user.

The point information 15 is information indicating the number of points. The point information 15 may be information indicating an amount of money converted by a number of points and a predetermined rate.

In the example illustrated in FIG. 2, user identification information and biometric information (face image information in the case of FIG. 2) of two users, and a point value are associated with card identification information "XXXXX". Moreover, in a similar way, user identification information and biometric information of four users, and point information are associated with a card identifier "YYYYY".

A storage unit may be provided in an information processing device, or may be provided in an external server being capable of communicating with an information processing device.

When authentication by the authentication unit 103 is successful, the calculation unit 104 calculates a point value according to a combination of authenticated users. For example, in a service which gives a point value according to a visit, it is assumed that a point value given when a user visits alone is a normal point value, and the calculation unit 104 calculates a point value 1.5 times the normal point value when users A and B visit as a group, and the calculation unit 104 calculates a point value 2 times the normal point value when users A, B, and C visit as a group, for example. Moreover, for example, in a service which gives a point value according to a purchase price of a commodity, it is assumed that a point value according to a purchase price of a commodity is a normal point value, and the calculation unit 104 calculates a point value 1.5 times the normal point value when the users A and B visit as a group, and the calculation unit 104 calculates a point value 2 times the normal point value when the users A, B, and C visit as a group, for example.

The processing unit 105 adds a point value calculated by the calculation unit 104 to point information stored, in association with user identification information of a successfully authenticated user, in the storage unit.

[Example of Hardware Configuration of Information Processing Device]

Figure 3:
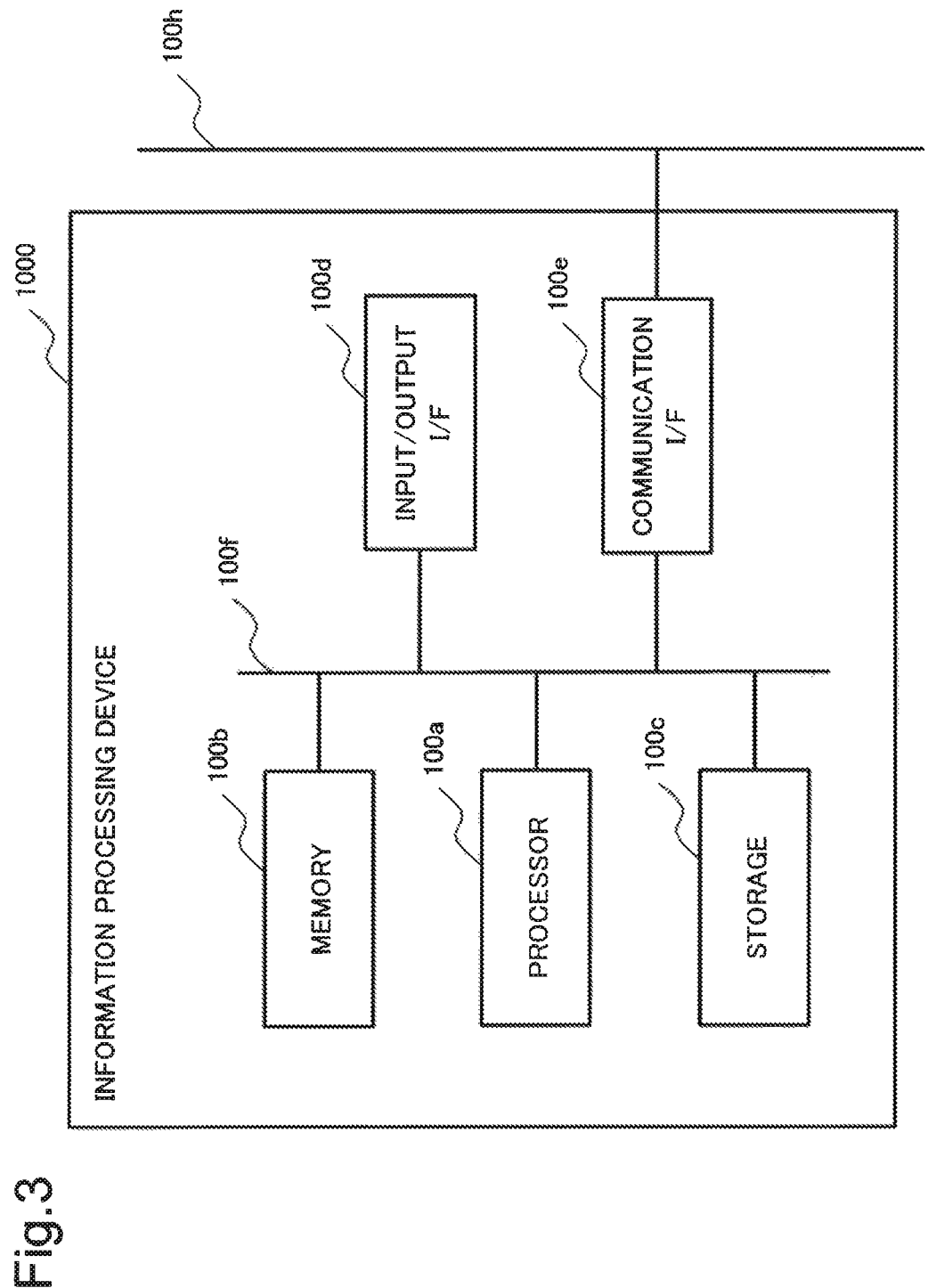
FIG. 3 is a diagram illustrating a hardware configuration of the information processing device 1000.

FIG. 3 is a diagram illustrating a hardware configuration of the information processing device 1000.

The information processing device 1000 includes a processor 100*a*, a memory 100*b*, a storage 100*c*, an input/output interface (input/output I/F) 100*d*, and a communication interface (communication I/F) 100*e*. The processor 100*a*, the memory 100*b*, the storage 100*c*, the input/output interface 100*d*, and the communication interface 100*e* are connected to one another by a data transmission path 100*f* serving to mutually transmit and receive data.

The processor 100*a* is an operational processing device such as a central processing unit or a graphics processing unit. The processor 100*a* achieves each function of each processing unit (the acquisition unit 102, the authentication unit 103, the calculation unit 104, and the processing unit 105) of the information processing device 1000 by executing each program stored in the storage 100c described later. Herein, when executing each program, the processor 100a may execute the programs after reading the programs on the memory 100b described later, or may execute the programs without reading the program on the memory 100b.

The memory 100b is a memory such as a random access memory (RAM) or a read only memory (ROM).

The storage 100c is a memory device such as a hard disk drive, a solid state drive, or a memory card. Moreover, the storage 100c may be a memory such as a RAM or a ROM. The storage 100c stores a program which achieves a function of each processing unit (the acquisition unit 102, the authentication unit 103, the calculation unit 104, and the processing unit 105).

When the information processing device includes a storage unit, the memory 100b or the storage 100c constitutes the storage unit.

The communication interface 100e transmits and receives data to and from an external device. The communication interface 100e communicates with an external device via, for example, a wired network or a wireless network 100h.

Note that a hardware configuration of the information processing device 1000 is not limited to the configuration illustrated in FIG. 3.

[Operation]

Figure 4:
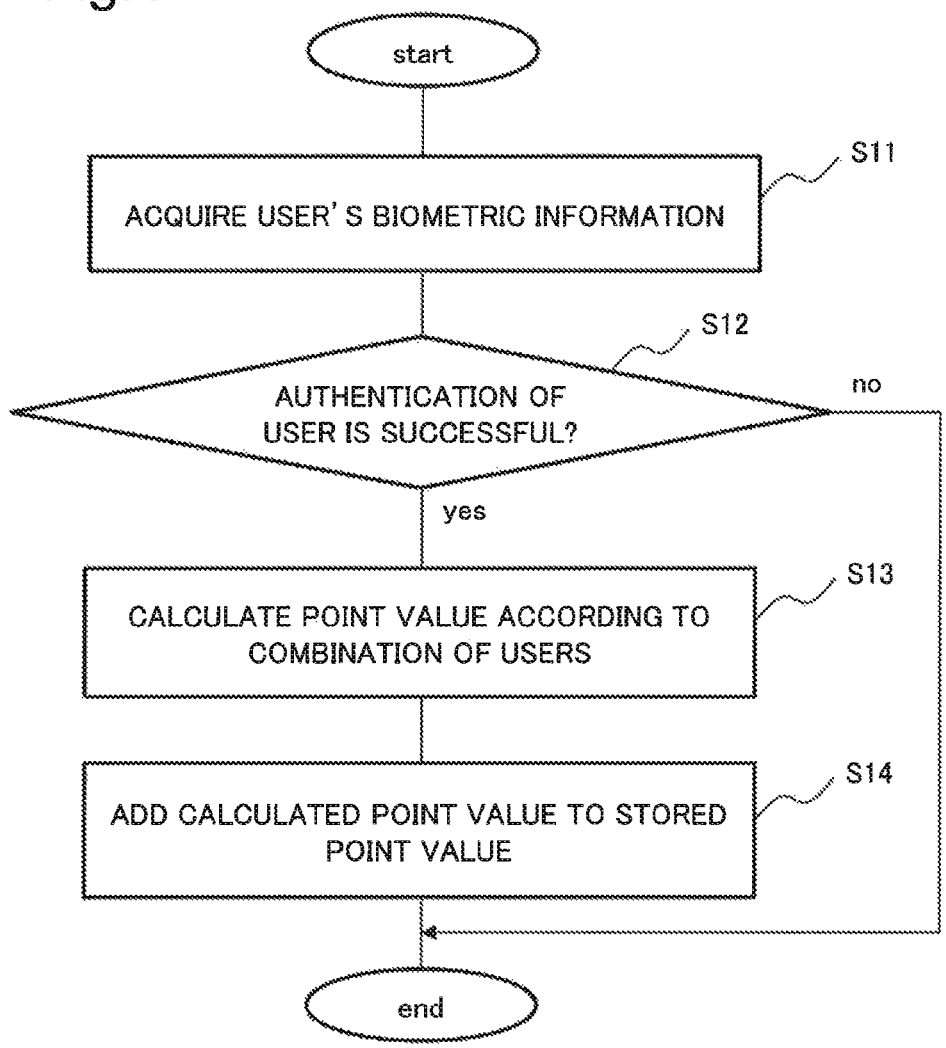
FIG. 4 is a flowchart describing an operation of the information processing device 1000.

FIG. 4 is a flowchart describing an operation of the information processing device 1000 according to the present example embodiment.

As a premise, the storage unit stores user information pertaining to a plurality of users and including user identification information and user's biometric information, respectively, and point information, in association with card identification information of a single point card, as described above.

The acquisition unit 102 acquires user's biometric information (step S11). The authentication unit 103 authenticates a user by using the biometric information acquired by the acquisition unit 102 in the step S11, and referring to the storage unit (step S12). When authentication by the authentication unit 103 is unsuccessful (no in the step S12), processing ends. On the other hand, when authentication by the authentication unit 103 is successful (yes in the step S12), the calculation unit 104 calculates a point value according to a combination of authenticated users (step S13). Then, the processing unit 105 adds the point value calculated by the calculation unit 104 in the step S13 to point information stored, in association with user identification information of a successfully authenticated user, in the storage unit (step S14).

An operation of the information processing device 1000 is specifically described by using an example illustrated in FIG. 2. It is assumed that, in the step S11, the acquisition unit 102 acquires face image information of a user identified with user identification information "12345" and a user identified with user identification information "54321". In the step S12, the authentication unit 103 authenticates a user by using the face image information acquired by the acquisition unit 102 in the step S11, and referring to the storage unit. When the face image information acquired by the acquisition unit 102 coincides with face image information stored in the storage unit, authentication is successful. When authentication is successful, the calculation unit 104 calculates a point value according to a combination of authenticated users, i.e., a combination of the user identified with the user identification information "12345" and the user identified with the user identification information "54321", in the step S14. Then, in the step S14, the processing unit 105 adds the point value calculated by the calculation unit 104 in the step S13 to point information, i.e., 123 pts stored, in association with user identification information of a successfully authenticated user, in the storage unit.

[Action and Effect]

According to the information processing device 1000 in the present example embodiment, the calculation unit 104 calculates a point value according to a combination of authenticated users. Thus, a point can be given in various manners without performing a complicated operation.

When a point is given according to a visit, the information processing device 1000 is achieved by, for example, a point giving device disposed at a store. On the other hand, when a point is given according to a commodity purchase, the information processing device 1000 is achieved by, for example, a point-of-sale (POS) terminal in the store.

Herein, a POS terminal is a device provided at a register counter in a store. A POS terminal includes instruments such as a keyboard, a display, (or a touch panel display), a bar code scanner, an image scanner, a cash drawer, an automatic change machine, and a receipt printer, and performs clearance processing by utilizing these instruments. In addition to these instruments, the POS terminal may also include a contact type or non-contact type card reader/writer.

When the information processing device 1000 is achieved by a POS terminal, the POS terminal is provided with, for example, a camera and a microphone, as the acquisition unit 102. Note that a camera and a microphone may be provided near a POS terminal, and the acquisition unit 102 of the POS terminal may acquire biometric information acquired by the camera and the microphone.

Note that a POS terminal may be in a form in which a commodity registration device that performs registration processing of a purchase target commodity is integrated with a settlement device that performs settlement processing of a commodity registered by the commodity registration device, or may be in a form in which a commodity registration device is separate from a settlement device. An integrated form in which both registration processing and settlement processing of a purchase target commodity are performed by a customer is referred to as a self form. Moreover, a separate form is referred to as a semi-self form. In the semi-self form, for example, registration processing of a purchase target commodity is performed by a clerk, and settlement processing is performed by a customer. When the information processing device 1000 is achieved by a POS terminal in a semi-self form, the information processing device 1000 may be achieved by either a commodity registration device or a settlement device.

The information processing device 1000 may be achieved by using a plurality of calculating machines.

Second Example Embodiment

Figure 5:
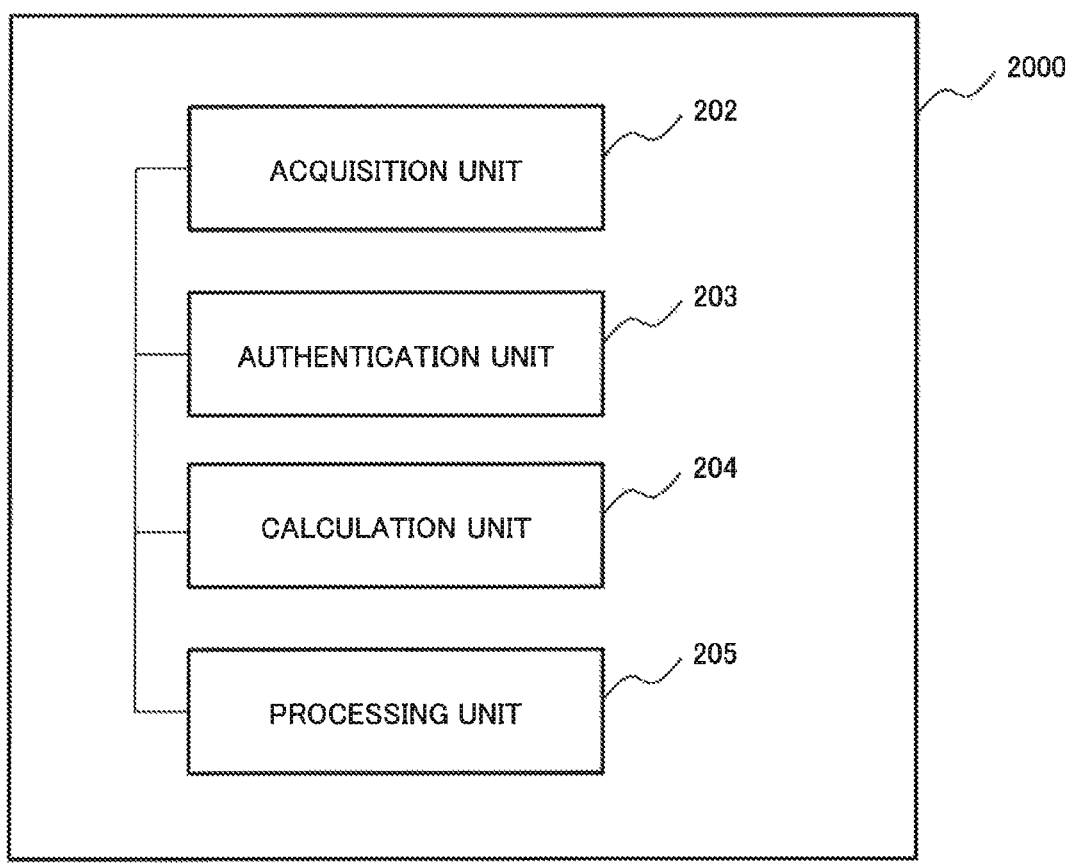
FIG. 5 is a diagram illustrating a configuration of an information processing device 2000 according to a second example embodiment.

FIG. 5 is a diagram illustrating a configuration of an information processing device 2000 according to a second example embodiment. The information processing device 2000 includes an acquisition unit 202, an authentication unit 203, a calculation unit 204, and a processing unit 205. Descriptions are omitted for configurations similar to those in the information processing device 1000 according to the first example embodiment.

The calculation unit 204 calculates a point value according to a combination of authenticated users by referring to a storage unit (not illustrated).

The storage unit stores information (combination information) 16 pertaining to a combination of card identification information 11 and user identification information, and information (calculation criterion information) 17 pertaining to a calculation criterion of a point value, in association with each other. FIG. 6 is a diagram illustrating one example of information stored by the storage unit. In the example illustrated in FIG. 6, a scale factor is adopted as the calculation criterion information 17. In the example illustrated in FIG. 6, for card identification information "XXXXX", a normally given point value (e.g., a point value according to a purchase price) is given when a user identified with user identification information "12345" or a user identified with user identification information "54321" visits alone and purchases a commodity. On the other hand, when the user identified with the user identification information "12345" and the user identified with the user identification information "54321" visit together and then purchase a commodity, a point value 2 times the normally given point value is given. It is possible to consider in a similar way for card identification information "YYYYY".

In the example illustrated in FIG. 6, the greater a number of authenticated users is, the higher a given point value becomes. Generally, as compared to a visit by a small customer, a visit by a group of customers such as a family tends to result in purchase of a greater number of commodities and an increase in a purchase price. Thus, there is a case where, for a store, a visit by a group of customers is desired rather than a visit by a small customer. It is possible to encourage persons to visit in group, by configuring the information processing device 2000 in such a way that the greater a number of authenticated users is, the higher a given point value becomes.

A calculation method of a point is described by using FIGS. 2, 4, and 6. It is assumed that, in a step S11, the acquisition unit 202 acquires face image information of a user identified with user identification information "13579" and a user identified with user identification information "02468". In a step S12, the authentication unit 203 authenticates a user by using the face image information acquired by the acquisition unit 202 in the step S11, and referring to the storage unit. When the face image information acquired by the acquisition unit 202 coincides with face image information stored in the storage unit, authentication is successful. When authentication is successful, the calculation unit 204 calculates a point value according to a combination of authenticated users, i.e., a combination of the user identified with the user identification information "13579" and the user identified with the user identification information "02468", in a step S14. More specifically, the calculation unit 204 searches for information illustrated in FIG. 6 with combination information of authenticated users as a key, and reads calculation criterion information "×1.2". Then, the calculation unit 204 calculates, as a point value, a value 1.2 times a normally given point value (e.g., a point value according to a purchase price). Then, in the step S14, the processing unit 205 adds the point value calculated by the calculation unit 204 in the step S13 to point information, i.e., 567 pts stored, in association with user identification information of a successfully authenticated user, in the storage unit.

Figure 7:
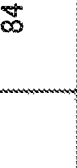
FIG. 7 is a diagram illustrating one example of information stored by the storage unit.
Figure 7:
Figure 7:
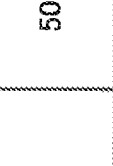
Figure 7:
Figure 7:
Figure 7:

Furthermore, it is also possible to configure the information processing device 2000 in such a way that a given point value becomes higher when a group including a particular user visit. For example, it is possible to configure the information processing device 2000 in such a way that, when a fair intended for a child is held at a store, a given point value becomes higher in the case where a person visits together with a child. FIGS. 7 and 8 are diagrams illustrating one example of information stored by the storage unit. As illustrated in FIG. 7, the storage unit stores user information 14a including attribute information 18. In the example illustrated in FIG. 7, the attribute information 18 is information pertaining to an age of a user. The storage unit also stores calculation criterion information 17a as illustrated in FIG. 8. In the example illustrated in FIG. 8, for example, when a combination of users authenticated as a result of authentication by the authentication unit 203 satisfy a condition indicated by condition information 20 of condition identification information "1", i.e., when a baby less than twelve months old is included in a combination of authenticated users, points 3 times a normally given point value (e.g., a point value according to a purchase price) are given.

Herein, processing when a plurality of conditions are satisfied is described. For example, in the example illustrated in FIG. 8, when a baby less than twelve months old and a person aged 60 and above are included in a combination of authenticated users, both a condition indicated by the condition information 20 of the condition identification information "1" and a condition indicated by condition information 20 of condition identification information "3" are satisfied. In this case, a calculation criterion to be applied can be determined on the basis of a preset degree of priority. Moreover, an additional value or an average value of a scale factor "3" when the condition indicated by the condition information 20 of the condition identification information "1" is satisfied or a scale factor "1.4" when the condition indicated by condition information 20 of condition identification information "3" are satisfied can also be a new scale factor. Further, a calculation criterion when a plurality of conditions are satisfied can also be additionally set.

According to the present example embodiment, the calculation unit 204 calculates a point value according to a combination of authenticated users by referring to the storage unit. Thus, a point can be given in various manners without performing a complicated operation.

Modification Example 1

FIG. 9 is a diagram illustrating information stored in the storage unit. The storage unit can store information that associates information (threshold value information) 21 pertaining to a threshold value of an authentication rate with calculation criterion information 17b.

The authentication unit 203 can calculate an authentication rate when authenticating a user. An authentication rate is, for example, an index indicating likelihood of identify. When an authentication rate is, for example, 85% or more, the authentication unit 203 determines that authentication is successful.

By referring to the storage unit, the calculation unit 204 calculates a point value according to an authentication rate calculated by the authentication unit 203. For example, it is assumed that a group of 3 persons visit, and two of the members of the group have authentication rates equal to or more than a threshold value (e.g., 90% or more), but the remaining one person has an authentication rate less than the threshold value. In this case, according to the example in FIG. 9, a scale factor of a point is "1.1". Note that, when a plurality of conditions including the conditions illustrated in FIGS. 7 and 8 are satisfied, an additional value or an average value of a scale factor corresponding to each condition can also be a new scale factor. A calculation criterion when a plurality of conditions are satisfied can also be additionally set.

Modification Example 2

In the example illustrated in FIG. 5, one piece of point information is associated with one piece of card identification information. Otherwise, it is also possible to associate a plurality of pieces of point information with one piece of card identification information. When a plurality of pieces of point information are associated with one piece of card identification information, the processing unit adds point information of each user to user identification information of each user of a group.

According to Modification Examples 1 and 2 described above, giving of a point conforming to a utilization form of a point card is enabled without performing a complicated operation.

Third Example Embodiment

Figure 10:
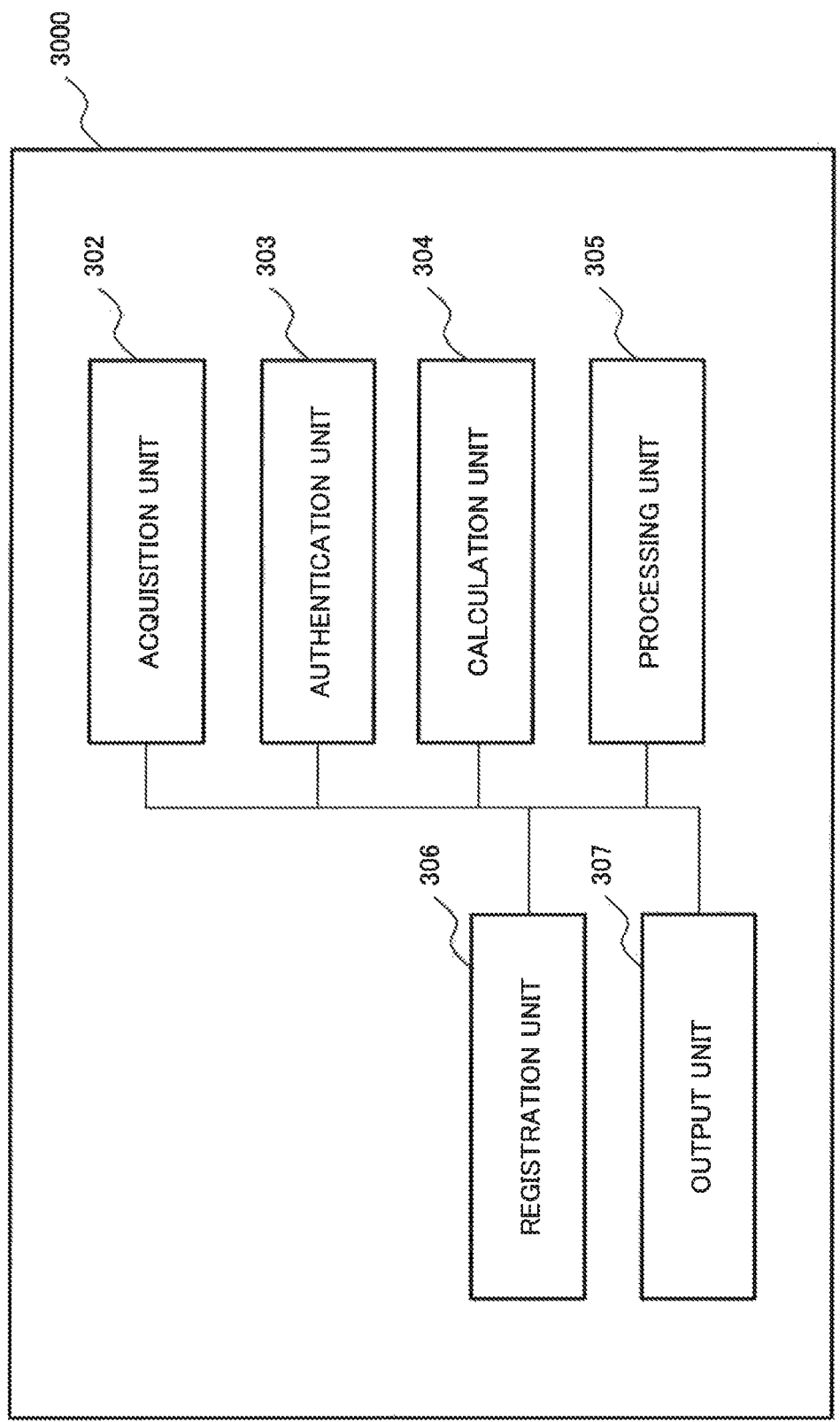
FIG. 10 is a diagram illustrating a configuration of an information processing device 3000 according to a third example embodiment.

FIG. 10 is a diagram illustrating a configuration of an information processing device 3000 according to a third example embodiment. In addition to the configurations of the information processing device 1000 and the information processing device 2000 according to the first and second example embodiments, the information processing device 3000 includes a registration unit 306 and an output unit 307. Descriptions are omitted for configurations similar to those in the information processing device 1000 and the information processing device 2000.

The registration unit 306 registers card identification information 11 and user information 14 in association with each other by using user's biometric information 13 acquired by an acquisition unit 302. For the card identification information 11, the user information 14 including user identification information 12 and the user's biometric information 13 are registered. An operation of the information processing device 3000 when user information and a group are registered is described by using FIG. 11. For example, it is assumed that users visit in group. The acquisition unit 302 acquires biometric information 13 of each user of the group (step S21). Then, the registration unit 306 associates the acquired biometric information 13 of each user with the user identification information 12 allocated to each user. In other words, the registration unit 306 generates user information 14 of each of all the users of the group (step S22). Further, the registration unit 306 associates the user information 14 of each of all the users of the group with one piece of card identification information 11 (step S23). In this way, user information and a group are registered.

When, for example, a camera is used as the acquisition unit 302, the acquisition unit 302 can image respective users of a group one by one, and acquire biometric information one by one in order. In this case, the registration unit 306 groups user information according to an input from a clerk or a customer. Moreover, the acquisition unit 302 can also image all group members at a time, and acquire biometric information of all the group members at a time. In this case, the registration unit 306 recognizes users included in an obtained image as users belonging to one group, and groups user information of the users included in the obtained image.

Furthermore, the registration unit 306 can register a calculation criterion when user information and a group are registered. The registration unit 306 registers a calculation criterion, for example, according to an input from a clerk or a customer.

Information registered by the registration unit 306 is stored in a storage unit (not illustrated). Alternatively, the registration unit 306 can update information stored in the storage unit.

Note that registration processing of user information and a group can also be performed by using a registration device disposed in a store in addition to a POS terminal, or a personal computer at home. In these cases, the registration unit 306 performs registration processing by using biometric information (e.g., face image information) acquired by an acquisition unit (e.g., a camera) provided in a registration device disposed in a store or provided in a personal computer at home.

For a customer or a clerk, the output unit 307 performs display based on biometric information acquired by the acquisition unit 302, or output based on a point value calculated by a calculation unit 304. The output unit 307 is, for example, a display, (or a touch panel display), or a microphone disposed in a POS terminal.

According to the present example embodiment, it is possible to obtain an advantageous effect similar to those in the first and second example embodiments. Moreover, by providing the registration unit 306, it is possible to register a giving form of a point conforming to a utilization form of a point card. Further, by providing the output unit 307, a clerk or a customer can confirm biometric information and a point value.

Modification Example 3

The registration unit 306 can also register a priority order when a point is utilized. For example, in the case where point information of each user is associated with user identification information of each user of a group, the registration unit 306 can previously register a user whose point is utilized (point value is subtracted) when each of all users of a group is authenticated.

Herein, an operation of the information processing device 3000 when a point is utilized is described by using FIG. 12. Note that a processing unit 305 is assumed to not only add but also subtract a point value. First, the acquisition unit 302 acquires user's biometric information (step S31). An authentication unit 303 authenticates a user by using the biometric information acquired by the acquisition unit 302 in the step S31, and referring to the storage unit (step S32). When authentication by the authentication unit 303 is unsuccessful (no in the step S32), processing ends. On the other hand, when authentication by the authentication unit 303 is successful (yes in the step S32), the processing unit 305 subtracts the point value according to an input from an input unit (not illustrated), from point information stored, in association with user identification information of a successfully authenticated user, in the storage unit (step S33). A point value to be utilized is input by, for example, a clerk or a customer via the input unit.

Furthermore, the registration unit 306 can also register a utilization rate of a point. For example, in the example illustrated in FIG. 2, the registration unit 306 can register a utilization rate of a point in such a way that, when an authenticated user utilizes a point value of 123 pts associated with card identification information "XXXXX", a user whose user identification information is identified by "12345" can utilize all 123 pts, but a user whose user identification information is identified by "54321" is allowed to utilize only a point value of 80% of 123 pts.

When an unsuccessfully authenticated member is present among members of a group (no in the step S32), a warning can be issued by the output unit 307. Consequently, for example, when a member of a group is taken by a malicious third party and forced to utilize a point, it is possible to prevent utilization of a point by the malicious third party.

While the example embodiments of the present invention are described above with reference to the drawings, these example embodiments are exemplifications of the present invention, and it is also possible to adopt a combination of the example embodiments described above, or various configurations other than those described above.

Examples of supplementary embodiments will be described as follows.

(Supplementary note 1)

An information processing device comprising:

an acquisition unit for acquiring user's biometric information;

an authentication unit for authenticating a user by using the biometric information acquired by the acquisition unit, and referring to a storage unit for storing user information pertaining to a plurality of users and point information in association with identification information of a single point card, the user information including user identification information and user's biometric information, and;

a calculation unit for calculating a point value according to a combination of the authenticated users when the authentication is successful; and a processing unit for adding the point value calculated by the calculation unit to the point value stored, in association with the user identification information of the successfully authenticated user, in the storage unit.

(Supplementary note 2)

The information processing device according to Supplementary note 1, wherein the storage unit stores a combination of the user identification information, and a calculation criterion of the point value, in association with each other, and the calculation unit calculates a point value according to a combination of the authenticated users by referring to the storage unit.

(Supplementary note 3)

The information processing device according to Supplementary note 2, wherein the storage unit stores the calculation criterion according to a number of users included in the combination of the user identification information.

(Supplementary note 4)

The information processing device according to Supplementary note 2 or 3, wherein the storage unit stores the calculation criterion according to an attribute of a user included in a combination of the user identification information.

(Supplementary note 5)

The information processing device according to any one of Supplementary notes 1 to 4, further comprising a registration unit for registering identification information of a point card and the user information in association with each other by using the user's biometric information acquired by the acquisition unit.

(Supplementary note 6)

The information processing device according to any one of Supplementary notes 1 to 5, further comprising a display unit for performing display based on the user's biometric information acquired by the acquisition unit or display based on the point value calculated by the calculation unit.

(Supplementary note 7)

An information processing method comprising:

an acquisition step for acquiring user's biometric information;

an authentication step for authenticating a user by using the biometric information acquired in the acquisition step, and referring to a storage unit for storing user information pertaining to a plurality of users and point information in association with identification information of a single point card, the user information including user identification information and user's biometric information, and;

a calculation step for calculating a point value according to a combination of the authenticated users when the authentication is successful; and an addition step for adding the point value calculated in the calculation step to the point value stored, in association with the user identification information of the successfully authenticated user, in the storage unit.

(Supplementary note 8)

The information processing method according to Supplementary note 7, wherein the storage unit stores a combination of the user identification information, and a calculation criterion of the point value, in association with each other, and, in the calculation step, calculating a point value according to a combination of the authenticated users by referring to the storage unit.

(Supplementary note 9)

The information processing method according to Supplementary note 8, wherein the storage unit stores the calculation criterion according to a number of users included in the combination of the user identification information.

(Supplementary note 10)

The information processing method according to Supplementary note 8 or 9, wherein the storage unit stores the calculation criterion according to an attribute of a user included in a combination of the user identification information.

(Supplementary note 11)

The information processing method according to any one of Supplementary notes 7 to 10, further comprising a registration step for registering identification information of a point card and the user information in association with each other by using the user's biometric information acquired in the acquisition step.

(Supplementary note 12)

The information processing method according to any one of Supplementary notes 7 to 11, further comprising a display step for performing display based on the user's biometric information acquired in the acquisition step or display based on the point value calculated in the calculation step.

(Supplementary note 13)

A program storage medium storing a program that causes a computer to execute:

an acquisition process of acquiring user's biometric information;

an authentication process of authenticating a user by using the biometric information acquired in the acquisition step, and referring to storage unit for storing user information pertaining to a plurality of users and point information in association with identification information of a single point card, the user information including user identification information and user's biometric information, and;

a calculation process of calculating a point value according to a combination of the authenticated users when the authentication is successful; and an addition process of adding the point value calculated in the calculation process to the point value stored, in association with the user identification information of the successfully authenticated user, in the storage unit.

(Supplementary note 14)

The program storage medium storing a program according to Supplementary note 13, wherein the storage unit stores a combination of the user identification information, and a calculation criterion of the point value, in association with each other, and storing a program that causes the computer to further perform:

in the calculation process, calculating a point value according to a combination of the authenticated users by referring to the storage unit.

(Supplementary note 15)

The program storage medium storing a program according to Supplementary note 14, wherein the storage unit stores the calculation criterion according to a number of users included in the combination of the user identification information.

(Supplementary note 16)

The program storage medium storing a program according to Supplementary note 13 or 14, wherein the storage unit stores the calculation criterion according to an attribute of a user included in a combination of the user identification information.

(Supplementary note 17)

The program storage medium storing a program according to any one of Supplementary notes 13 to 16, wherein storing a program for causing a computer to perform a registration process of registering identification information of a point card and the user information in association with each other by using the user's biometric information acquired in the acquisition process.

(Supplementary note 18)

The program storage medium storing a program according to any one of Supplementary notes 13 to 17, wherein storing a program for causing a computer to perform a display process of performing display based on the user's biometric information acquired in the acquisition process or display based on the point value calculated in the calculation process.

REFERENCE SIGNS LIST

11 Card identification information
12 User identification information
13 Biometric information
14, 14a User information
15 Point information
16 Combination information
17, 17a, 17b Calculation criterion information
18 Attribute information
19 Condition identification information
20 Condition information
21 Threshold value information
100a Processor
100b Memory
100c Storage
100d Input/output I/F
100e Communication I/F
100f Data transmission path
100h Wired network or wireless network
102, 202, 302 Acquisition unit
103, 203, 303 Authentication unit
104, 204, 304 Calculation unit
105, 205, 305 Processing unit
306 Registration unit
307 Output unit
1000, 2000, 3000 Information processing device

The invention claimed is:

1. An information processing device comprising:
one or more memories storing instructions; and
one or more processors configured to execute the instructions to:
acquire biometric information;
authenticate users by using the biometric information acquired, and referring to a storage for storing user information pertaining to a plurality of users and point information in association with identification information of a single point card, the user information including user identification information and user's biometric information;
calculate an authentication rate for each of the users when authenticating the users;
calculate, based on a calculation criteria information corresponding to the authentication rate, a point value according to a combination of the authenticated users and the authentication rate calculated for each of the users, when the authentication is successful; and
add the point value calculated to the point information stored, in association with the user identification information of the successfully authenticated users, in the storage,
wherein the single point card is issued for the plurality of users,
wherein the authentication rate is an index indicating likelihood of identity,
wherein the calculation criteria information has at least two different scale factors respectively corresponding to at least two ranges of certification rates, wherein an increase in certification rate corresponds to an increase in scale factor.

2. The information processing device according to claim 1, wherein
the storage stores a combination of the user identification information, and a calculation criterion of the point value, in association with each other, and
the one or more processors are further configured to execute the instructions to:
calculate a point value according to a combination of the authenticated users by referring to the storage.

3. The information processing device according to claim 2, wherein
the storage stores the calculation criterion according to a number of users included in the combination of the user identification information.

4. The information processing device according to claim 2 wherein
the storage stores the calculation criterion according to an attribute of a user included in a combination of the user identification information.

5. The information processing device according to claim 1, wherein
the one or more processors are further configured to execute the instructions to:
register identification information of a point card and the user information in association with each other by using the biometric information acquired.

6. The information processing device according to claim 1 wherein
the one or more processors are further configured to execute the instructions to:
perform display based on the biometric information acquired or display based on the point value calculated.

7. An information processing method comprising:
acquiring biometric information;
authenticating users by using the biometric information acquired in the acquiring, and referring to a storage for storing user information pertaining to a plurality of users and point information in association with identification information of a single point card, the user information including user identification information and user's biometric information;
calculating an authentication rate for each of the users when authenticating the users;
calculating, based on a calculation criteria information corresponding to the authentication rate, a point value according to a combination of the authenticated users and the authentication rate calculated for each of the users, when the authentication is successful; and
adding the point value calculated to the point information stored, in association with the user identification information of the successfully authenticated users, in the storage,
wherein the single point card is issued for the plurality of users,
wherein the authentication rate is an index indicating likelihood of identity,
wherein the calculation criteria information has at least two different scale factors respectively corresponding to at least two ranges of certification rates, wherein an increase in certification rate corresponds to an increase in scale factor.

8. The information processing method according to claim 7, wherein
the storage stores a combination of the user identification information, and a calculation criterion of the point value, in association with each other, and
in the calculating, calculating a point value according to a combination of the authenticated users by referring to the storage.

9. The information processing method according to claim 8, wherein
the storage stores the calculation criterion according to a number of users included in the combination of the user identification information.

10. The information processing method according to claim 8, wherein
the storage stores the calculation criterion according to an attribute of a user included in a combination of the user identification information.

11. The information processing method according to claim 7, further comprising
registering identification information of a point card and the user information in association with each other by using the biometric information acquired in the acquiring.

12. The information processing method according to claim 7, further comprising
performing display based on the biometric information acquired in the acquiring or display based on the point value calculated in the calculating.

13. A program storage medium storing a program that causes a computer to execute:
an acquisition process of acquiring biometric information;
an authentication process of authenticating users by using the biometric information acquired in the acquisition process, and referring to a storage for storing user information pertaining to a plurality of users and point information in association with identification information of a single point card, the user information including user identification information and user's biometric information;
a calculation process of calculating an authentication rate for each of the users when authenticating the users;
a calculation process of calculating, based on a calculation criteria information corresponding to the authentication rate, a point value according to a combination of the authenticated users and the authentication rate calculated for each of the users, when the authentication is successful; and
an addition process of adding the point value calculated in the calculation process to the point information stored, in association with the user identification information of the successfully authenticated users, in the storage,
wherein the single point card is issued for the plurality of users,
wherein the authentication rate is an index indicating likelihood of identity,
wherein the calculation criteria information has at least two different scale factors respectively corresponding to at least two ranges of certification rates, wherein an increase in certification rate corresponds to an increase in scale factor.

14. The program storage medium storing a program according to claim 13, wherein
the storage stores a combination of the user identification information, and a calculation criterion of the point value, in association with each other, and
storing a program that causes the computer to further perform:
in the calculation process, calculating a point value according to a combination of the authenticated users by referring to the storage.

15. The program storage medium storing a program according to claim 14, wherein
the storage stores the calculation criterion according to a number of users included in the combination of the user identification information.

16. The program storage medium storing a program according to claim 14, wherein
the storage stores the calculation criterion according to an attribute of a user included in a combination of the user identification information.

17. The program storage medium storing a program according to claim 13, wherein storing a program for causing a computer to perform
a registration process of registering identification information of a point card and the user information in association with each other by using the biometric information acquired in the acquisition process.

18. The program storage medium storing a program according to claim 13, wherein storing a program for causing a computer to perform
a display process of performing display based on the biometric information acquired in the acquisition process or display based on the point value calculated in the calculation process.

19. The information processing device according to claim 1, wherein
the one or more processors are further configured to execute the instructions to:

register a utilization rate of a point for each user,
use points according to the utilization rate of the authenticated user for the point information stored.

* * * * *